(12) United States Patent
Kerfoot

(10) Patent No.: US 7,645,384 B2
(45) Date of Patent: Jan. 12, 2010

(54) ENVIRONMENTAL REMEDIATION METHOD USING OZONOPHILIC BACTERIA WITHIN A LIQUID COATING OF BUBBLES

(75) Inventor: William B. Kerfoot, Falmouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 0 days.

(21) Appl. No.: 12/254,359

(22) Filed: Oct. 20, 2008

(65) Prior Publication Data
US 2009/0039016 A1 Feb. 12, 2009

Related U.S. Application Data

(63) Continuation of application No. 10/916,863, filed on Aug. 12, 2004, now Pat. No. 7,442,313.

(60) Provisional application No. 60/498,031, filed on Aug. 27, 2003.

(51) Int. Cl.
   *C02F 3/00* (2006.01)
(52) U.S. Cl. .................. 210/601; 210/620; 210/756; 210/759; 210/760
(58) Field of Classification Search .................. 210/601, 210/759, 760, 620, 756
See application file for complete search history.

(56) References Cited

U.S. PATENT DOCUMENTS

| 1,920,719 | A | 8/1933 | Stich |
| 2,517,525 | A | 8/1950 | Cummings |
| 2,845,185 | A | 7/1958 | Winderweedle, Jr. |
| 2,946,446 | A | 7/1960 | Herbert |
| 3,027,009 | A | 3/1962 | Price |
| 3,206,178 | A | 9/1965 | Lamb |
| 3,219,520 | A | 11/1965 | Box |
| 3,276,994 | A | 10/1966 | Andrews |
| 3,441,216 | A | 4/1969 | Good |
| 3,570,218 | A | 3/1971 | Finney |
| 3,669,276 | A | 6/1972 | Woods |
| 3,708,206 | A | 1/1973 | Hard et al. |

(Continued)

FOREIGN PATENT DOCUMENTS

DE 3805200 9/1998

(Continued)

OTHER PUBLICATIONS

A. M. Makarov and S. S. Sorokin, "Heat Exchange of a Bubble Coated with a Liquid Film on the Rear Surface," Chemical and Petroleum Engineering, vol. 30, No. 2, 1994.*

(Continued)

*Primary Examiner*—Chester T Barry
(74) *Attorney, Agent, or Firm*—Lathrop & Gage LLP

(57) ABSTRACT

Remediation for groundwater, soil, sediment bodies, bodies of water, tanks, pipes, and their surrounding areas are described. Remediation includes treating a site contaminated with toxic organic compounds by assessing for the presence or absence of suitable ozonophilic bacteria at the site and introducing ozone to the site. The ozonophilic bacteria are introduced to the site if the ozonophilic bacteria are not present or not present in sufficient quantities in the site. Ozone is introduced to the site in an amount sufficient to stimulate growth of the suitable ozonophilic bacteria. Other oxidants can also be used.

20 Claims, 3 Drawing Sheets

U.S. PATENT DOCUMENTS

| | | | |
|---|---|---|---|
| 3,814,394 A | 6/1974 | Murray |
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |
| 4,048,072 A | 9/1977 | McCullough |
| 4,049,552 A | 9/1977 | Arff |
| 4,064,163 A | 12/1977 | Drach et al. |
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A | 9/1987 | Schultz |
| 4,696,739 A | 9/1987 | Pedneault |
| 4,730,672 A | 3/1988 | Payne |
| 4,804,050 A | 2/1989 | Kerfoot |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,491 A | 1/1993 | Graves et al. |
| 5,178,755 A | 1/1993 | Lacrosse |
| 5,180,503 A | 1/1993 | Gorelick et al. |
| 5,205,927 A | 4/1993 | Wickramanayake |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A | 9/1993 | Hobby |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,362,400 A | 11/1994 | Martinell |
| 5,364,537 A | 11/1994 | Paillard |
| 5,375,539 A | 12/1994 | Rippberger |
| 5,389,267 A | 2/1995 | Gorelick et al. |
| 5,398,757 A | 3/1995 | Corte et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,520,483 A | 5/1996 | Vigneri |
| 5,525,008 A | 6/1996 | Wilson |
| 5,545,330 A | 8/1996 | Ehrlich |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant et al. |
| 5,624,635 A | 4/1997 | Pryor |
| 5,663,475 A | 9/1997 | Elgal |
| 5,664,628 A | 9/1997 | Koehler et al. |
| 5,667,733 A | 9/1997 | Waldron, Sr., |
| 5,676,823 A | 10/1997 | McKay et al. |
| 5,698,092 A | 12/1997 | Chen |
| 5,741,427 A | 4/1998 | Watts et al. |
| 5,827,485 A | 10/1998 | Libal et al. |
| 5,833,388 A | 11/1998 | Edwards et al. |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Edwards et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,210,955 B1 | 4/2001 | Hayes |
| 6,214,240 B1 | 4/2001 | Yasunaga et al. |
| 6,217,767 B1 | 4/2001 | Clark |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 | 3/2002 | Briggs et al. |
| 6,357,670 B2 | 3/2002 | Ganan-Calvo |
| 6,364,162 B1 | 4/2002 | Johnson |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,447,676 B1 | 9/2002 | Kerfoot |
| 6,488,850 B2 | 12/2002 | Perriello |
| 6,533,499 B2 | 3/2003 | Breeding |
| 6,582,611 B1 | 6/2003 | Kerfoot |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |
| 6,913,251 B2 | 7/2005 | Kerfoot |

| | | |
|---|---|---|
| 6,921,477 B2 | 7/2005 | Wilhelm |
| 6,984,329 B2 | 1/2006 | Kerfoot |
| 7,022,241 B2 | 4/2006 | Kerfoot |
| 7,033,492 B2 | 4/2006 | Kerfoot |
| 7,131,638 B2 | 11/2006 | Kerfoot |
| 7,156,984 B2 | 1/2007 | Kerfoot |
| 7,208,090 B2 | 4/2007 | Applegate et al. |
| 7,264,747 B2 | 9/2007 | Kerfoot |
| 7,300,039 B2 | 11/2007 | Kerfoot |
| 7,442,313 B2 * | 10/2008 | Kerfoot ............. 210/760 |
| 2002/0029493 A1 | 3/2002 | Baek |
| 2002/0109247 A1 | 8/2002 | Jager et al. |
| 2003/0029792 A1 | 2/2003 | Kerfoot |
| 2003/0222359 A1 | 12/2003 | Jager |
| 2004/0045911 A1 | 3/2004 | Kerfoot |
| 2005/0067356 A1 | 3/2005 | Bowman et al. |
| 2006/0243668 A1 | 11/2006 | Miller et al. |

FOREIGN PATENT DOCUMENTS

| | | |
|---|---|---|
| EP | 0402158 | 12/1990 |
| EP | 0546335 | 6/1993 |
| GB | 2005655 A | 4/1979 |
| GB | 2185901 A | 8/1987 |
| JP | 1-304838 | 12/1989 |
| JP | 3267196 | 11/1991 |
| JP | 4-171036 | 6/1992 |
| JP | 6-023378 | 1/1994 |
| JP | 40931314 | 12/1997 |
| WO | WO 98/21152 | 5/1998 |
| WO | WO 99/54258 | 10/1999 |
| WO | WO 2005063367 | 7/2005 |

OTHER PUBLICATIONS

Dowideit, Peter, et al. "Reaction Of Ozone With Ethene And Its Methyl- And Chlorine-Substituted Derivatives In Aqueous Solution," Environmental Science & Technology; vol. 32, No. 8, pp. 1112-1119, 1998.

Sato, Masayuki, et al. "Pulsed Discharge Plasma In Water-Chemical And Physical Properties," AOTs-8, The Eight International Conference on Advanced Oxidation Technologies for Water and Air Remediation Abstracts, Toronto, Ontario, Canada, 2 pages, Nov. 17-21, 2002.

Kalish, P.J., et al., "The Effect of Bacteria On Sandstone Permeability," Journal of Petroleum Technology, pp. 805-814, Jul. 1964.

Haapea, Pia, et al. "Treatment of PAH Contaminated Soil By Ozonation, Soil Washing and Biological Treatment," The Second International Conference on Oxidation and Reduction Technologies for In-Situ Treatment of Soil and Groundwater. Toronto, Ontario, Canada, 2 pages, Nov. 17-21, 2002.

Brough, Matthew J., et al., "Active Biofilm Barriers For Waste Containment And Bioremediation: Laboratory Assessment," In Situ And On-Site Bioremediation: vol. 4, pp. 233-238, 1997.

Brown, PhD, Richard A., et al, "Combining Oxidation And Bioremediation for The Treatment Of Recalcitrant Organics," Chemical And Physical Processes In Support of Bioremediation, vol. 4, pp. 457-462, Nov. 17-21, 2002.

Shaw, J.C., et al. "Bacterial Fouling In A Model Core System," Applied And Environmental Microbiology, vol. 49, No. 3, pp. 693-701, Mar. 1985.

Selected Filed History of related U.S. Appl. No. 10/916,863 between Dec. 28, 2006 to Jun. 18, 2008, 46 pages.

U.S. Appl. No. 09/470,167 (U.S. Appl. No. 6,436,285) Selected pages from File History dated Aug. 23, 2002 through Mar. 29, 2001, 38 pages.

U.S. Appl. No. 09/860,659, Selected pages from Image File Wrapper dated Aug. 13, 2002 through Aug. 23, 2004, 68 pages.

U.S. Appl. No. 09/943,111, Selected pages from Image File Wrapper dated Jan. 30, 2003 through Feb. 19, 2005, 47 pages.

U.S. Appl. No. 09/993,152, Selected pages from Image File Wrapper dated Sep. 4, 2007 through Mar. 10, 2009, 59 pages.

U.S. Appl. No. 10/223,166 (U.S. Appl. No. 6,596,161) Selected pages from File History dated Nov. 6, 2002 through Jul. 22, 2003, 22 pages.

U.S. Appl. No. 10/354,584 Selected pages from Image File Wrapper dated Jul. 30, 2003 through Jun. 6, 2004, 32 pages.

U.S. Appl. No. 10/365,027, Selected pages from Image File Wrapper dated Apr. 16, 2004 through May 2, 2005, 53 pages.

U.S. Appl. No. 10/602,256, Selected pages from Image File Wrapper dated Jan. 11, 2005 through Dec. 12, 2002, 33 pages.

U.S. Appl. No. 10/745,939, Selected pages from Image File Wrapper dated Jun. 22, 2006 through Jul. 22, 2008, 110 pages.

U.S. Appl. No. 10/895,015, Selected pages from Image File Wrapper dated Jul. 14, 2006 through Feb. 9, 2009, 102 pages.

U.S. Appl. No. 10/910,441 Selected pages from Image File Wrapper dated Dec. 1, 2004 through Sep. 12, 2005, 36 pages.

U.S. Appl. No. 10/963,353 Selected pages from Image File Wrapper dated Aug. 23, 2005 through Dec. 13, 2006, 46 pages.

U.S. Appl. No. 10/994,960 Selected pages from Image File Wrapper dated Mar. 11, 2005 through Dec. 2, 2005, 36 pages.

U.S. Appl. No. 10/997,452 Selected pages from Image File Wrapper dated Jun. 27, 2007 through Mar. 23, 2009, 144 pages.

U.S. Appl. No. 11/145,871 selected pages from Image File Wrapper, Jun. 12, 2007 through Jun. 27, 2008, 82 pages.

U.S. Appl. No. 11/145,871, Response to Office Action filed Dec. 16, 2008.

U.S. Appl. No. 11/145,871, Office Action mailed Mar. 18, 2009.

U.S. Appl. No. 11/145,871 Response to Office Action filed Jun. 16, 2009.

U.S. Appl. No. 11/146,722 Selected pages from Image File Wrapper dated Jun. 7, 2005 through Sep. 18, 2006, 70 pages.

U.S. Appl. No. 11/272,446 Selected pages from File History dated Jan. 22, 2008 through May 1, 2009, 60 pages.

U.S. Appl. No. 11/328,475 Selected pages from Image File Wrapper dated Jun. 30, 2006 through Aug. 15, 2007, 45 pages.

U.S. Appl. No. 11/409,892 Selected pages from Image File Wrapper dated Jul. 31, 2006 through May 21, 2009, 94 pages.

U.S. Appl. No. 11/485,080 Selected pages from Image File Wrapper dated May 11, 2007 through Jan. 9, 2009, 83 pages.

U.S. Appl. No. 11/485,080, Response to Office Action filed May 8, 2009, 4 pages.

U.S. Appl. No. 11/485,223 Office Action mailed Jun. 15, 2009, 8 pages.

U.S. Appl. No. 11/485,223 Selected pages from Image File Wrapper dated Feb. 26, 2008 through Mar. 11, 2009, 36 pages.

U.S. Appl. No. 11/594,019 Selected pages from Image File Wrapper dated Apr. 25, 2007 through Oct. 29, 2008, 45 pages.

U.S. Appl. No. 11/849,413 Selected pages from Image File Wrapper dated Sep. 4, 2007 through Mar. 10, 2009, 94 pages.

U.S. Appl. No. 12/177,467 Selected pages from Image File Wrapper dated Dec. 29, 2008 through Jun. 12, 2009, 20 pages.

U.S. Appl. No. 12/272,462, Restriction Requirement mailed Jun. 2, 2009, 6 pages.

U.S. Appl. No. 12/259,051, Response to Office Action filed Jun. 23, 2009, 8 pages.

U.S. Appl. No. 12/259,051, Office Action mailed Mar. 24, 2009, 6 pages.

Canadian Patent Application No. 2,351,257, Office Action dated May 1, 2009, 4 pages.

PCT/US05/25478, International Search Report & Written Opinion, mailed Feb. 15, 2006, 4 pages.

PCT/US05/25478, International Preliminary Report on Patentability, Jan. 23, 2007, 4 pages.

Abstract JP 6-238260, Karuto, Aug. 30, 1994.

*ThinkVillage-Kerfoot LLC* v. *Groundwater & Environmental Services, Inc.*, Complaint for Patent Infringement, US District Court for the District of Massachusetts, Oct. 7, 2008, 5 pages.

*ThinkVillage-Kerfoot LLC* v. *Groundwater & Environmental Services, Inc.*, Answer and Counterclaims, Civil Action No. 1:08-cv-11711-GAO, Dec. 5, 2008, 7 pages.

*ThinkVillage-Kerfoot LLC* v. *Groundwater & Environmental Services, Inc.*, Amended Answer and Counterclaims, Civil Action No. 1:08-cv-11711-GAO, Dec. 15, 2008, 7 pages.

*ThinkVillage-Kerfoot LLC* v. *Groundwater & Environmental Services, Inc.*, Plaintiff's Response to Defendant Groundwater & Environmental Services, Inc.'s Amended Counterclaims, Civil Action No. 1:08-cv-11711-GAO, Dec. 30, 2008, 5 pages.

Civil Action No. 1:08-cv-11711-GAO, Groundwater & Environmental Services, Inc.'s Objections And Responses To Plaintiff's Requests for Production of Documents and Things, Mar. 4, 2009, 54 pages.

Civil Action No. 1:08-cv-11711-GAO, Groundwater & Environmental Services, Inc.'s Objections And Answers To Plaintiffs Interrogatories, Mar. 4, 2009, 10 pages.

Civil Action No. 1:08-cv-11711-GAO, ThinkVillage-Kerfoot, LLC's Responses To Defendant's Interrogatories (Nos. 1-11) Apr. 9, 2009, 12 pages.

Civil Action No. 1:08-cv-11711-GAO, ThinkVillage-Kerfoot, LLC's Objections And Responses To Defendant's First Set of Requests For Production (Nos. 1-98) Apr. 9, 2009, 37 pages.

Civil Action No. 1:08-cv-11711-GAO, ThinkVillage-Kerfoot, LLC's Supplemental Responses To Defendant's Interrogatories (Nos. 7 and 8) Jun. 2, 2009, 9 pages.

PCT/US04/43634 International Search Report mailed May 18, 2005, 1 page.

PCT/USO4/43634 International Preliminary Report on Patentability, Jun. 26, 2006, 5 pages.

U.S. Appl. No. 12/177,467 Notice of Allowance dated Sep. 2, 2009, 8 pages.

U.S. Appl. No. 12/259,051 Notice of Allowance dated Aug. 24, 2009, 7 pages.

U.S. Appl. No. 11/485,223 Notice of Allowance dated Sep. 2, 2009, 7 pages.

U.S. Appl. No. 11/145,871, Notice of Allowance dated Sep. 9, 2009, 7 pages.

U.S. Appl. No. 12/272,462 Notice of Allowance dated Sep. 21, 2009, 8 pages.

U.S. Appl. No. 12/272,462, Response to Restriction Requirement filed Jul. 2, 2009, 12 pages.

U.S. Appl. No. 11/409,892, Notice of Allowance dated Oct. 1, 2009, 5 pages.

U.S. Appl. No. 11/485,080, Notice of Allowance dated Jul. 9, 2009, 4 pages.

\* cited by examiner

US 7,645,384 B2

ENVIRONMENTAL REMEDIATION METHOD USING OZONOPHILIC BACTERIA WITHIN A LIQUID COATING OF BUBBLES

This application is a continuation of U.S. patent application Ser. No. 10/916,863 filed Aug. 12, 2004, now U.S. Pat. No. 7,442,313, which claims benefit of U.S. Provisional Patent Application Ser. No. 60/498,031, filed Aug. 27, 2003, the disclosures of which are incorporated herein by reference.

BACKGROUND

There is a well-recognized need for remediation, or clean-up, of contaminants (e.g., chemicals) that exist in a variety of settings, including in soil, sand, ground and surface water, aquifers, water supply pipes, tanks, retail facilities, storage facilities, and sediment collections. These settings are frequently contaminated with various constituents such as volatile organic compounds (VOCs), toxic organic compounds, petroleum-derived chemicals, and other environmental hazards. These contaminated areas pose a threat to the environment, and ultimately to the health and safety of all living creatures. Thus, equipment and methods for effectively and safely dealing with remediation of environmental contaminants is of significant importance.

SUMMARY

According to an aspect of the present invention, a method includes treating a site contaminated with toxic organic compounds by assessing for the presence or absence of suitable ozonphilic bacteria at the site; and introducing ozone to the site.

Embodiments within the scope of the invention include those where ozonphilic bacteria is introduced to the site if the ozonphilic bacteria is not present or not present in sufficient quantities in the site. The concentration and rate of ozone introduced is determined based on the presence or absence of the suitable ozonphilic bacteria present at the site. Ozone is introduced to the site in an amount sufficient to stimulate growth of the suitable ozonphilic bacteria. Ozone is introduced to the site in an amount sufficient to stimulate growth of the suitable ozonphilic bacteria without killing suitable ozonphilic bacteria outside a distance of about one meter from the location of ozone introduction to the site. The ozone is introduced to the site in an amount in a range of 1 to 300 ppmv to stimulate growth of suitable ozonphilic bacteria in a distal region from the location of ozone introduction to the site.

According to an additional aspect of the invention, a method includes treating a site contaminated with toxic organic compounds by assessing the presence of bacteria from the genera: *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas;* and introducing an oxidant to the site.

Embodiments include those where the oxidant is ozone or ozone/hydrogen peroxide. The ozone is introduced to the site in an amount sufficient to stimulate growth of the bacteria. The ozone is introduced to the site in an amount sufficient to stimulate growth of bacteria without killing bacteria outside a distance of about one meter from the location of ozone introduction to the site. The oxidant is oxygen or oxygen-enriched air.

According to additional aspects of the invention, a method of treating a site contaminated with toxic organic compounds includes identifying the amount of bacteria present at the site and introducing additional bacteria to the site and introducing ozone to the site.

Ozone is introduced into the site in microbubbles. The microbubbles are introduced using a microporous diffuser. The additional bacteria include at least one genera of *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas.* Ozone is introduced in a continuous manner or in a pulsed manner.

According to an additional aspect of the present invention, a method of treating a site contaminated with petroleum compounds includes identifying the amount of bacteria present at the site and introducing ozone to the site in an amount insufficient to kill bacteria beyond about one meter of the location of ozone introduction to the site.

According to an additional aspect of the invention, a method of treating a site contaminated with toxic organic compounds includes obtaining a sample of the site soil, sand or water, assessing the level of and type of bacteria present in the sample introducing bacteria, if insufficient levels of bacteria are present, to the site or an ozonphilic bacteria is not present in the site; and introducing ozone to the site.

The additional bacteria are introduced if the existing levels are less than about 10,000 cfu/mL in a groundwater sample or less than about 25,000 cfu/gm in a soil sample. The additional bacteria are introduced if the type of bacteria is not from at least one of the genera *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas.* The additional bacteria are introduced if the type of bacteria is not from at least one genera of the *Microbacterium,* the *Burkordiua,* the *Pseudomonas* and the *Xanthobacteria* genera. The ozone is introduced in an amount resulting in proliferation of the bacteria population. The ozone is introduced to the site in an amount in a range of 1 to 300 ppmv to stimulate growth of bacteria in a distal region from the location of ozone introduction to the site. The amount of bacteria introduced to the contaminated site is adjusted based on the result of the assessed levels of toxic organic compounds in the sample. The method of claim 21 wherein oxygen concentration in the site is maintained at a level to inhibit bacterial growth in within a critical plugging radius to the injection screen, but promote bacterial growth at distances beyond a critical radius about the site of introduction.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
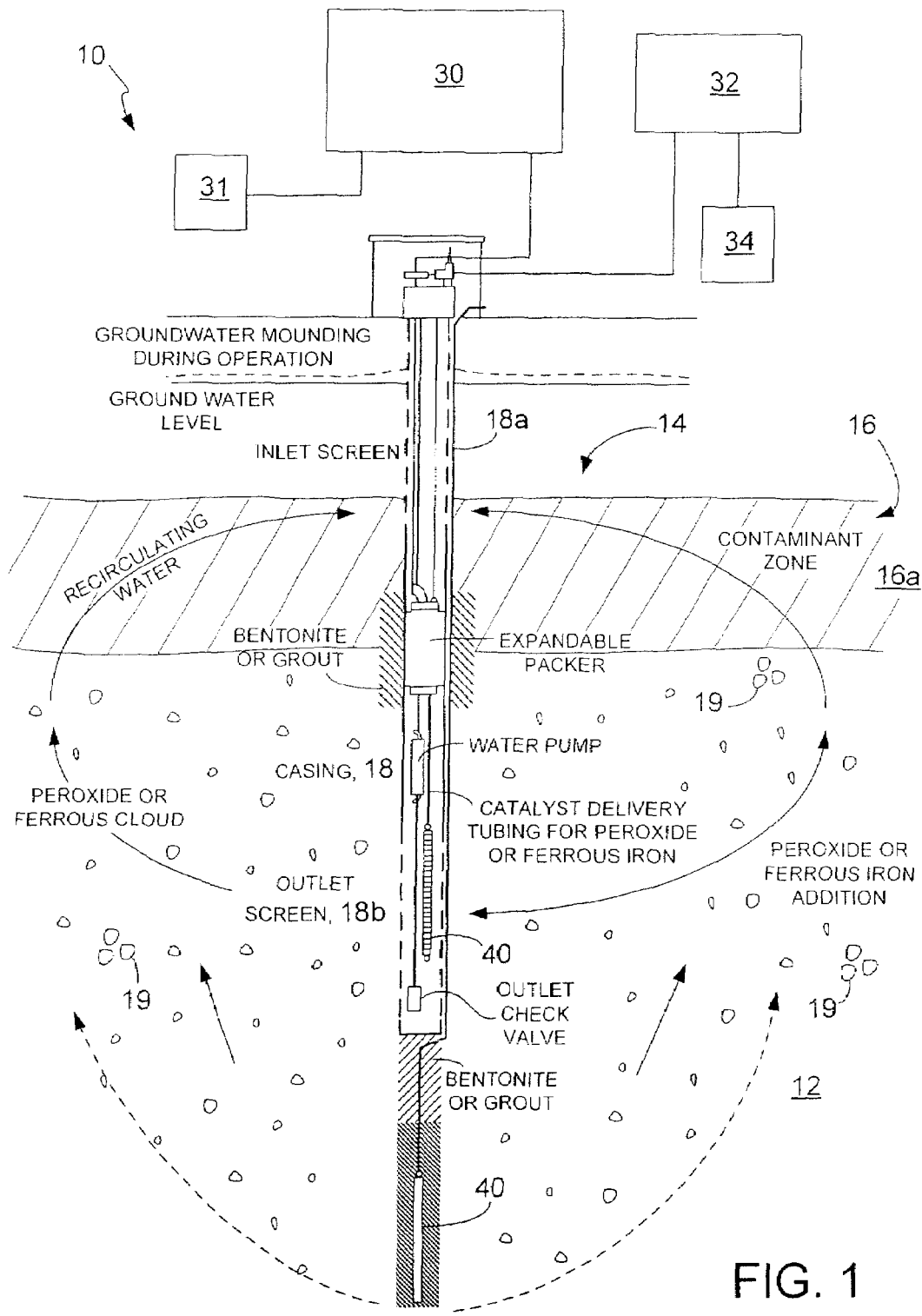
FIG. 1 illustrates an ozone introduction apparatus at a treatment site using a recirculation well.

Referring now to FIG. 1, a sparging arrangement 10 for use with plumes, sources, deposits or occurrences of contaminants in a valdose zone 16a or aquifer 16, is shown. The arrangement 10 is disposed in a well 14 that has a casing 18 which can include an inlet screen 18a and includes an outlet screen 18b. With inlet and outlet screens 18a, 18b, a recirculation well is provided to promote re-circulation of water through the surrounding ground/aquifer region 12. The casing 18 supports the ground about the well 14. Disposed through the casing 18 are one or more diffusers 40. Here two diffusers 40 are shown. In one embodiment, microbubbles 13 of air, air enriched with oxygen or air and ozone and/or oxygen are emitted into the surrounding formation. Other arrangements can include coated microbubbles discussed below. The arrangement of FIG. 1 can includes a packer 17, but need not include a packer for certain configurations. Alternatively, diffusers that do not have a microporous surface can be used. A water pump and check valve can also be included in the well.

The arrangement 10 also includes a compressor/pump and compressor/pump control mechanism 30 to feed a first fluid 31, e.g., a gas such as an ozone/air or oxygen enriched air mixture into the diffuser 40. A second compressor/pump and compressor/pump control mechanism 32 is also coupled to a source 34 of a second fluid e.g., a liquid, e.g., hydrogen peroxide or a peroxide, to feed a second fluid to some embodiments of a diffuser 40, e.g., a multi-fluid diffuser 40. Catalysts can be delivered to the microporous diffusers 40, via tubing 42 (not numbered). As illustrated in FIG. 1, a lower diffuser 40 is embedded in Bentonite or grout. Ozonophillic bacteria 19 are introduced if suitable bacteria are not present or if the bacteria are not present in insufficient quantities.

Figure 2:
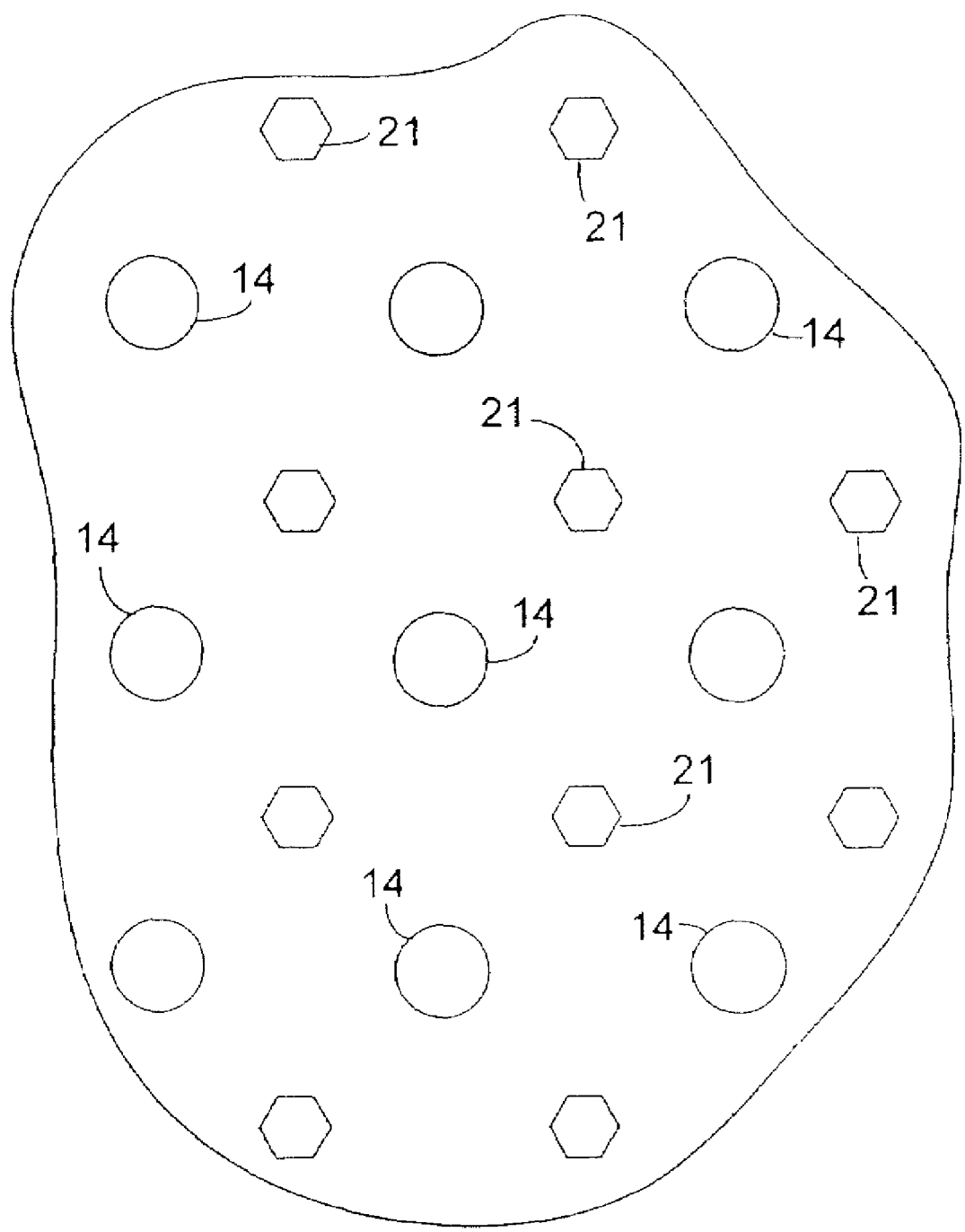
FIG. 2 is a diagram depicting a typical arrangement of wells with the apparatus in FIG. 1 and injection points for bacteria introduction.

Referring to FIG. 2, one of many possible arrangements to inject bacteria into the site is shown. Ozonophillic bacteria are introduced in several ways. One way to introduce the ozonophillic bacteria would be to inject bacteria through other wells or through injectable probes 21 that were spaced from wells 14 and arranged much as in a centered grid across the contaminated site, as shown. The injectable probes or minipoints, like those discussed in Brame (U.S. Pat. No. 4,310,057) or Kerfoot Apparatus for and Method of Underground Fluid Sampling (U.S. Pat. No. 4,804,050) would be suitable. Other types of probes or minipoints could be used. Various spacing can be used. Ideally, the injectable probes are disposed between adjacent spargewells 14. Given typically spacings of such wells, a 15 foot spacing from a well is suitable.

Another way would be to include the bacteria in the materials introduced with the microporous diffusers. However, this would necessitate turning off the ozone supply for a period until the bacteria could be introduced and dispersed, because at such levels of ozone, the bacteria generally would be destroyed.

Bacteria include any bacteria that are suitable for conversion of hydrocarbon moieties of chemical compounds (in whole or in part) to carbon dioxide and water possible other products. In one aspect, the bacteria particularly useful are those that tolerate or can thrive exposure to ozone and multiply (e.g., by a factor$\times 10^3$) (e.g., fast growers) on hexadecane. Bacteria suitable for the processes described herein include those of the genera: *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas.*

The *Microbacterium,* the *Burkordiva,* the *Pseudomonas* and the *Xanthobacteria* are particularly useful. For example, certain *Pseudomonas* species have a characteristic that their cell walls are resistance to hydroxyl radicals because they secret Peroxidase (hydrogen peroxide and reaction with bond iron ferripyochelin).

When the oxidant is a gas, e.g., ozone, the gas can be provided from a tank (e.g., provided via compressed tanks), provided using a compressor, or generated on-site in with a suitable generator. Particular apparatus for delivery of ozone/air to diffusers include, e.g., Model 5020 C-Sparger® System, Model 6000 Palletized C-Sparger Unit, KTI Model 8600 Wall Mount Perozone™ System, KTI Model 8000 Series Palletized System; all available from Kerfoot Technologies, Inc., Mashpee, Mass. Others can be used.

In such instances, the gas can be introduced by microbubble or other suitable application technique, using a diffuser or applicator or a microporous diffuser, including as noted above and as in, e.g., U.S. Pat. Nos. 5,855,775; 6,083,407; 6,284,143. Ozone can also be introduced by use of ultraviolet (UV)-irradiating tubes in a treatment well, with the water flowing over the tubes to generate ozone. The UV-irradiating tubes are suspended centrally in a double-screened well with a packer/pump combination (e.g., a C-Sparge™ ozone recirculation well). In this case, an air or oxygen pump would not be required. Alternatively, ozone can be introduced by use of pulsed discharge plasma in water (see, for example, Sate and Sugiarto, "Pulsed Discharge Plasma in Water— Chemical and Physical Properties" in Abstracts of the *Eighth International Conference on Advanced Oxidation Technologies for Water and Air Remediation,* Toronto, Canada, Nov. 17-21, 2002). High voltage and short duration pulsed voltage can form intense plasma in conducting waters. The discharge system uses needle-plate electrodes. In the streamer discharge mode, plasma channels are formed in the water, yielding ozone concentrations. No compressors (air or oxygen) would be necessary for generating ozone in solution. The ozone is generated by electrolysis. In both instances, a pump to move the water away from the ozone generator is necessary for circulation and dispersion.

The normal application of ozone to sites for soil and groundwater remediation involves placement (by angering or geoprobe direct push) of diffusers 40 (e.g., Spargepoint® diffusers) below the water table across the treatment site. The microporous diffusers 40 have a pore size varying from about less than 0.3 or up to 1 micron as a low value to 50 microns or up to 200 microns as a high value, a porosity of about 30 to 45 percent, and a low resistance to gas flow through the side walls (usually 1 psi or less per foot of length at flows of about 1 cfm per foot of length). The diffusers (e.g., Spargepoint® diffusers) are placed about 10 to 20 feet below the water table if the spill is light nonaqueous petroleum liquid (LNAPL). A fine sand (e.g., "sugar sand"; 60 mesh size) is placed around the diffuser placement points to assure formation of fine channels and bubbles in the aquifer. The gas is pulsed at a rate of about 5 to about 30 minute intervals to assist transport through the soil capillary pores.

Peroxide (e.g., hydrogen peroxide, organic hydroperoxides) may be introduced as a liquid into the diffuser 40 (e.g., Laminar Spargepoint®, or individual Spargepoint®) or with a separate well screen in the vicinity of the ozone diffuser (e.g., Spargepoint®). In both cases, the ozone microbubbles become coated with the peroxide. Normally, the arrays are placed horizontally across, the site with 30% or greater overlap to achieve a more uniform distribution of oxidant at the site. The diffusers (e.g., Spargepoint®), when operated at about 3 to 5 cfm, normally will have a radius-of-influence (ROI) of 20-30 feet. The diffusers 40 can be placed in a staggered pattern vertically if the contaminated zone is broader than at the water table and within 10 feet below.

Again, a 30% overlap vertically is desirable. Since vertical hydraulic conductivity is usually less than horizontal, a 40-foot contaminant zone would require at least two vertically separated points.

Normally, peroxide is supplied to the diffusers (e.g., Laminar Spargepoint®) at a mass and molar (or gram) ratio of the ozone (mass) content, depending upon the target organic compound and its mass distribution. In the event of use of two (or more) diffusers (e.g., Spargepoint®) or a diffuser (ozone) and well screen (hydrogen peroxide), the time sequence can be varied, usually injecting the hydrogen peroxide first and then following with ozone to assure contact of the ozone gas with the hydrogen peroxide. The diffusers are any diffuser capable of delivering the agents (e.g., ozone, hydrogen peroxide, hydroperoxides). For example, the range of diffusers available from Kerfoot Technologies, Inc., Mashpee, Mass. known as Spargepoint® Microporous Bubblers (e.g., Models SPT1272, SPT 1293, SPT 1292, SPT 1294, and the like) can be used. The arrangement 10 can supply nutrients such as catalyst agents 42 including iron containing compounds such as iron silicates or palladium containing compounds such as palladized carbon. In addition, other materials such as platinum may also be used.

The gases useful in the microbubbles are any that are suitable for chemical or biological reaction and remediation. For example, in oxidative applications, ozone, oxygen and air are suitable gases. In reductive applications, nitrogen or hydrogen can be used. The gas suitable for an application is dependent, in part, on criteria such as the reaction desired, or the bacterial growth requirements (aerobic or anaerobic). The gas can be generated in-situ (e.g., ozone generator), provided using a compressor, or provided via compressed tanks.

Suitable microporous diffusers 40 are those having the ability to deliver a gas and a liquid such that microbubbles less than about 200 microns, preferably between about 0.3 and 200 microns, are produced including the gas therein, and in certain embodiments having a thin layer of the liquid material coating the microbubble. The diffuser 40 are constructed of a variety of materials suitable for the gases and liquids to be delivered. Suitable materials include, for example, stainless steel, high-density polyethylene (HDPE), low-density polyethylene (LDPE), polyvinyl chloride (PVC), polytetrafluoroethylene (PTFE, e.g., TEFLON), acetal (e.g., DELRIN), or polypropylene. The diffusers 40 can include concentric tubes of microporous material, optionally having additional packing materials (e.g., hydrophobic plastics, hydrophilic plastics, beads, interconnected fibers) sandwiched between the tubes to facilitate creation of the gas-liquid interface in the microbubble. These materials aid the liquid coating process of the gas flowing through the diffuser in the generation of microbubbles, in part by their hydrophilic or hydrophobic nature to enhance coating, and in part by their ability to increase the positioning of the liquid to optimize contact with the gas flowing through. Examples of diffusers suitable for use in the methods delineated herein include the laminar microporous SPARGEPOINT® diffuser or the C-SPARGER® diffuser (both available from Kerfoot Technologies, Inc., Mashpee, Mass.).

Aerosols or aerosolized liquid particles are one method by which coated microbubbles can be formed. The aerosolized particles are produced using an aerosolizer, including any apparatus suitable for providing an aerosolized form of a liquid (e.g., a commercial airbrush Badger 150). The aerosolized liquid particles can be any suitable for use in the coating application (i.e., chemical or biological reaction) and remediation process of interest, including for example, oxidants (e.g., hydrogen peroxide, organic hydroperoxides, potassium permanganate, Fenton's reagent (hydrogen peroxide and Fe(II))), catalysts (e.g., as delineated below), acids, (e.g., acetic, lactic), and nutrients (e.g., as delineated below).

The aerosol can be generated using an aerosol head including a reservoir of liquid or liquid and microfine particles mixture; a siphon tube made of e.g., TEFLON or resistant flexible plastic; a tube supply with compressed air; a mixing chamber where the liquid is drawn into the flowing gas; a spray head which controls the particle size and distribution of the aerosols; and a compression fitting which directs the aerosol flow into the air/ozone gas stream. The mixing chamber can be, for example, a Bernoulli chamber, that is, any chamber that (in accordance with Bernoulli's principle) is capable of compressing a fluid through a narrower opening into a larger chamber resulting in a variance in pressure. The aerosol head can further include connecting tubing such as TEFLON tubing $3/8$" to $1/2$" in diameter, polyvinyl chloride tubing $1/2$" to 1" in diameter, with o-ring seals (e.g., VITON) and threaded 5 ft. sections. The aerosol head is in communication with the microporous diffusers, in a manner to maintain a sufficient rate of gas flow to avoid condensing of the aerosol flow. The aerosol spray head can e adjustable to vary the liquid flow feed rate from between about $1/10$ to $1/10,000$ of the flow of the air/ozone volume flow. Also, the aerosol flow can be introduced continuously with the air/ozone flow.

In one embodiment of the arrangement 10, the arrangement uses a microporous diffuser 40. The microporous diffuser can be comprised of sintered plastic, stainless steel, or ceramic and has a porosity characteristic that delivers microbubbles having a diameter of about 0.3 or less to 200 microns. Suitable microporous diffusers such as Kerfoot Technologies Spargepoints can be used. The microbubbles include a source of oxygen, such as ozone/air, air, or oxygen enriched air. Other embodiments can use a two-port laminar diffuser or laminar multi-fluid diffuser 40. With the two-port laminar diffuser one of the inlets introduces a first gas stream within interior regions of the multi-fluid diffuser, a second introduces a fluid through porous materials in the laminar multi-fluid diffuser to coat bubbles that emanate from the interior of the laminar microporous diffuser. Suitable microporous diffusers such as Kerfoot Technologies Laminar Spargepoints can be used.

In still other embodiments a laminar multi-fluid diffuser that allows introduction of multiple, fluid streams, with any combination of fluids as liquids or gases can be used. The laminar multi-fluid diffuser has one of the inlets that introduces a first gas stream within interior regions of the multi-fluid diffuser, a second introduces a fluid through porous materials in the laminar multi-fluid diffuser, and a third inlet introduces a third fluid about the periphery of the laminar multi-fluid diffuser. The fluid streams can be the same materials or different. For example, the first fluid stream can be a gas such as an ozone/air mixture, the second a liquid such as hydrogen peroxide, and the third a liquid such as water. The outward flow of fluid, e.g., air/ozone from the first inlet results in the liquid, e.g., the hydrogen peroxide in the second flow to occur under a siphon condition developed by the flow of the air/ozone from the first inlet. Alternatively, the flows of fluid can be reversed such that, e.g., air/ozone from the second inlet and the liquid, e.g., the hydrogen peroxide flows from first inlet to have the ozone stream operate under a siphon condition, which can be used to advantage when the arrangement is used to treat deep deposits of contaminants. With the ozone generator under a siphon condition is advantageous for operation of the ozone generator at optimal efficiency and delivery of optimal amounts of ozone into the well, especially if the ozone generator is a corona discharge type. In this embodiment, the third fluid flow is water. The water is introduced along the periphery of the multi-fluid diffuser via the third inlet.

The arrangement 10 is disposed on sites of contamination, which are any location having at least one contaminant. The contaminant may be naturally occurring or introduced by human action. The site can be ground (e.g., soil, sand, dune, rock, gravel, sediment), or water (e.g., groundwater, aquifer, pool, river, lake, pond, marsh, wetland) or mixture thereof (e.g., riverbed, seabed, lakebed). The site can be natural (e.g., forest, river, lake, stream, beach, shoreline) or man-made (e.g., manufacturing site, storage site, or dispensing site). The site can be commercial or residential in nature. In particular, the site may be contaminated with toxic organic compounds. Thus petroleum wells or drill sites, sites having storage tanks (e.g., refineries, fueling stations, gas stations, transfer facilities), or sites where petroleum products are bought, sold, dispensed or disposed of (e.g., filling stations, automotive service shops, oil change or lubrication shops, boating service shops, airports and associated fueling facilities) are sites of contamination suitable for methods discussed herein.

By way of example, such contaminants can include volatile organic compounds; nonvolatile organic compounds; alkanes; alkenes; total petroleum hydrocarbons (TPH; includes alkanes, alkenes, aromatics, PAHs, BTEX, etc.); polyaromatic hydrocarbons (PAHs) (e.g., anthracene, fluoranthene, phenanthrene, naphthalene); polychlorinated biphenyls (PCBs)(e.g., arochlor 1016); chlorinated hydrocarbons (e.g., tetrachloroethene, cis- and trans-dichloroethene, vinyl chloride, 1,1,1-trichloroethane, 1,1-dichloroethane, 1,2-dichloroethane, methylene chloride, chloroform, etc.); methyl tertiary-butyl ether (MTBE); and BTEX (e.g., benzene, toluene, ethylbenzene, xylenes, and the like); explosive residues (e.g., nitrobenzenes, RDX, trinitrotoluene (TNT), etc.); and chlorinated pesticides (e.g., chlordane, heptachlor, etc.). The chemicals, (e.g., oxidants), microbubbles, apparatuses, biologics (e.g., bacteria), and methods herein are useful in remediating contaminants, including any one, or combination of, those delineated herein.

Oxidants, or oxidizing agents, are any chemical that is suitable for inducing another chemical compound to be oxidized when the two chemical entities are introduced to one another. Examples of oxidizing agents include ozone, hydrogen peroxide, organic hydroperoxides, oxygen, air, and the like, or combinations thereof. The oxidizing agents can be in any suitable delivery form, including gas, liquid, or combination thereof (e.g., hydrogen peroxide coated-microbubble having ozone therein).

Figure 3:
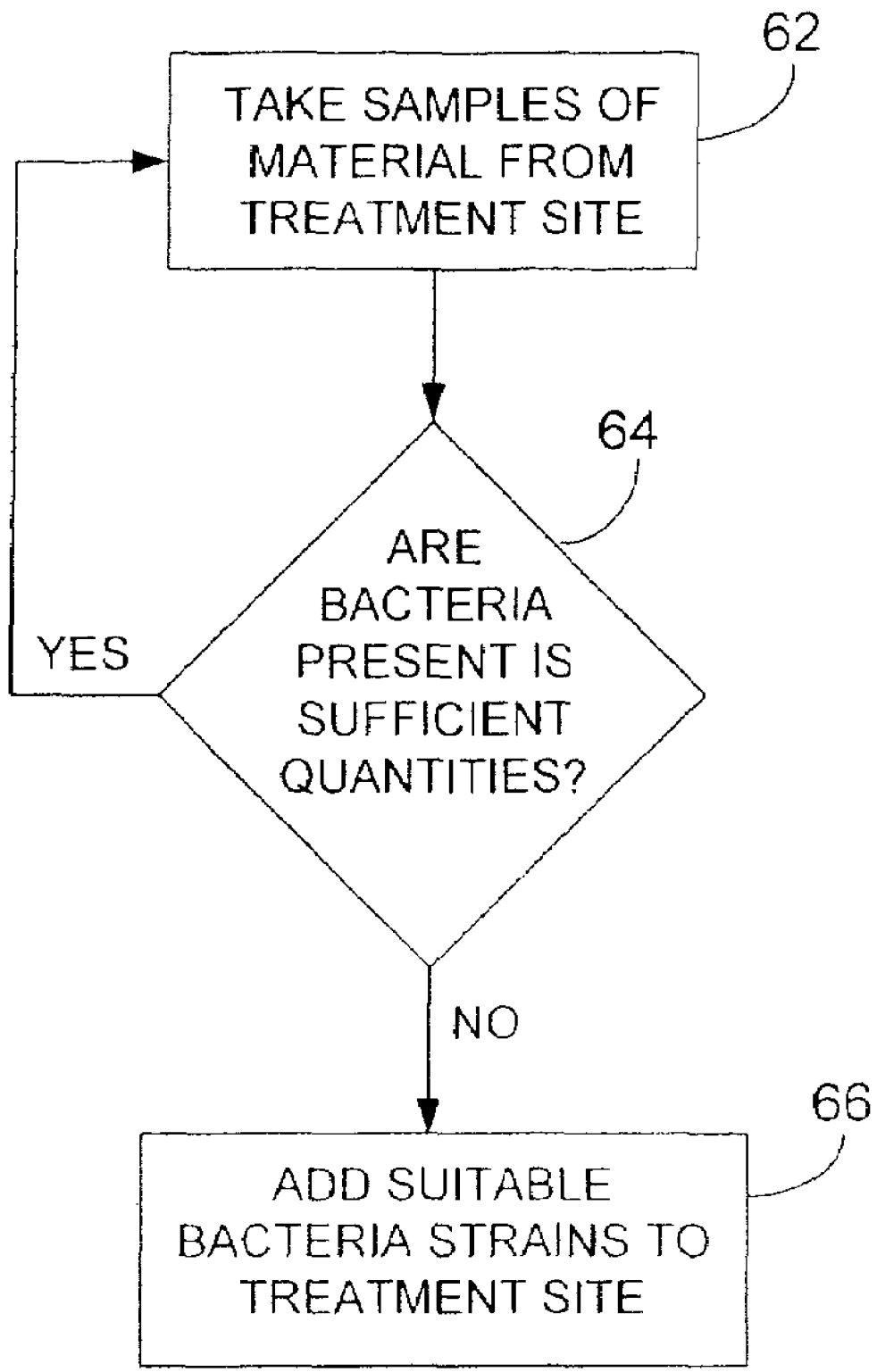
FIG. 3 is a flow chart depicting a treatment flow.

Referring to FIG. 3, samples of the contamination site (either before treatment is initiated, periodically during the treatment process, or after completion of the treatment process) are taken 62 for the determination of the presence of one or more bacteria and the levels of bacteria present. The samples are withdrawn from the site, using conventional techniques and are assessed 62 for the presence of suitable strains of bacteria useful in promoting destruction of contaminants present in the site. If assessment of the samples indicates an absence of or an insufficient quantity of the suitable bacteria strains, then a quantity of the suitable bacteria stains are introduced 66.

During treatment of the site oxidants, or oxidizing agents, are introduced via the diffusers. The presence of the oxidants induces chemical reactions and promotes biological reactions by rapidly multiplying suitable bacteria strains that decompose the contaminants.

Certain organic compounds are subject to oxidative or reductive chemical degradation, resulting in lower molecular weight fragments or by-products. These by-products may be involved in bacterial metabolism such that they are "consumed" by the bacteria and undergo a biological reaction or degradation. In other instances, the processes provide nutrients (e.g., oxygen, nitrogen, carbon, phosphorous, potassium) such that bacterial growth, support, or proliferations that occur upon consumption of the nutrients. These are also considered biological reactions. Further, certain processes delineated herein using oxidative chemical reaction conditions, such as ozone or ozone/hydrogen peroxide combinations, result in oxygen as a by-product (e.g., reduction of ozone to oxygen), which can act as feed for certain indigenous bacteria in the remediation area. Such enhancement of biological function, or bioremediation, is also considered within the scope of biological reaction.

The basic microbial process of biodegradation (aerobic) can be portrayed as a conversion of oxygen ($O_2$) to $CO_2$ and water plus more bacteria:

$$\text{Organic contaminant} \xrightarrow[O_2]{\text{bacteria}} CO_2 + H_2O + \text{more bacteria}$$

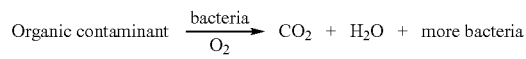

Whereas the conversion of oxygen ($O_2$) to $CO_2$ and water plus more bacteria may proceed rapidly in vat or surface vessels, maintaining an efficient and continuous degradation is more difficult in porous soils and open areas. Often evidence of natural biodegradation is shown by excess $CO_2$ in the overlying unsaturated soil zone (vadose zone) and low oxygen content in the saturated (aqueous) zone. The depletion of natural electron acceptors ($O_2$, $NO_3$, $SO_4$, Fe (III)), the depletion of natural electron donors (organic acids, e.g., acetate, lactate, $H_2$), the buildup of anaerobic metabolism gases such as $CO_2$, and the depletion of mineral nutrients ($NH_3$, $NO_3$, $PO_4$, K) regulate the rate of biodegradation.

An analysis of the volatile organic compound to be remediated takes into consideration the compound(s) Henry's Constant value (see, Tables 1 and 2), which is an indicator of the compound(s) proclivity to move from the liquid to the gaseous phase at an interface.

The newly observed microbial ozonphilic (i.e., ozone using bacteria) process can be viewed as:

$$\text{Organic contaminant} \xrightarrow[O_3]{\text{bacteria}} CO_2 + H_2O + O_2 + \text{more bacteria}$$

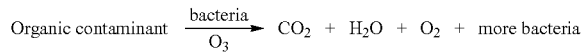

TABLE 1

HENRY'S CONSTANTS FOR CERTAIN COMPOUNDS

| High Henry's Constants ($\geq 10^{-5}$) | Henry's Law Constant (atm-m$^3$/mole) |
| --- | --- |
| Benzene | $5.6 \times 10^{-3}$ |
| Benzo(a) pyrene | $1.1 \times 10^{-4}$ |
| Benzo(b) fluoranthene | $1.1 \times 10^{-4}$ |
| Bromodichloromethane | $1.6 \times 10^{-3}$ |
| Bromoform | $5.5 \times 10^{-4}$ |
| Bromomethane | $6.2 \times 10^{-3}$ |
| Carbofuran | $9.2 \times 10^{-5}$ |
| Carbon Tetrachloride | $3.0 \times 10^{-2}$ |
| Carbon Disulfide | $3.0 \times 10^{-2}$ |
| Chlordane | $4.9 \times 10^{-5}$ |
| Chloroethane | $6.2 \times 10^{-4}$ |
| Chloroform | $2.7 \times 10^{-3}$ |
| Chloromethane | $8.8 \times 10^{-3}$ |
| Chrysene | $9.5 \times 10^{-5}$ |

TABLE 1-continued

HENRY'S CONSTANTS FOR CERTAIN COMPOUNDS

| High Henry's Constants ($\geq 10^{-5}$) | Henry's Law Constant (atm-m$^3$/mole) |
|---|---|
| 1,2 Dibromoethane (EDB) | $6.7 \times 10^{-4}$ |
| Dibromochloromethane | $8.7 \times 10^{-4}$ |
| 1,2-Dibromo-3-chloropropane | $1.5 \times 10^{-4}$ |
| 1,2-Dichlorobenzene | $1.9 \times 10^{-3}$ |
| 1,3-Dichlorobenzene | $3.3 \times 10^{-3}$ |
| 1,4-Dichlorobenzene | $2.4 \times 10^{-3}$ |
| Dichlorodifluoromethane | $3.4 \times 10^{-3}$ |
| 1,1-Dichloroethane | $5.6 \times 10^{-3}$ |
| 1,2-Dichloroethane | $9.8 \times 10^{-4}$ |
| 1,2-Dichloroethylene (cis) | $4.1 \times 10^{-3}$ |
| 1,2-Dichloroethylene (trans) | $9.4 \times 10^{-3}$ |
| 1,1-Dichloroethylene | $2.6 \times 10^{-2}$ |
| 1,2-Dichloropropane | $2.8 \times 10^{-3}$ |
| 1,3-Dichloropropene | $1.8 \times 10^{-2}$ |
| Dioxins | $5.6 \times 10^{-3}$ |
| Ethyl Benzene | $8.4 \times 10^{-3}$ |
| Fluorene | $1.0 \times 10^{-4}$ |
| Fluorotrichloromethane (freon 11) | $9.7 \times 10^{-2}$ |
| | $1.1 \times 10^{-4}$ |
| Heptachlor | $3.2 \times 10^{-5}$ |
| Heptachlor epoxide | $1.3 \times 10^{-3}$ |
| Hexachlorobenzene | $1.4 \times 10^{-5}$ |
| Lindane | $1.6 \times 10^{-5}$ |
| Methoxychlor | $1.4 \times 10^{-4}$ |
| Methyl isobutyl ketane | $2.7 \times 10^{-5}$ |
| Methyl ethyl ketone (MEK) | |
| Methylene chloride | $2.0 \times 10^{-3}$ |
| Monochlorobenzene | $3.8 \times 10^{-3}$ |
| n-Hexane | $1.4 \times 10^{-2}$ |
| Napththalene | $4.8 \times 10^{-4}$ |
| Polychlorinated biphenyls | $1.1 \times 10^{-3}$ |
| Pyrene | $1.1 \times 10^{-5}$ |
| Styrene | $2.8 \times 10^{-3}$ |
| 1,1,1,2-Tetrachloroethane | $2.4 \times 10^{-3}$ |
| 1,1,2,2-Tetrachloroethane | $4.6 \times 10^{-4}$ |
| Tetrachloroethylene | $1.8 \times 10^{-4}$ |
| Toluene | $6.6 \times 10^{-3}$ |
| 1,2,4-Trichlorobenzene | $1.4 \times 10^{-3}$ |
| 1,1,1-Trichloroethane | $1.7 \times 10^{-2}$ |
| 1,2,3-Trichloropropane | $3.4 \times 10^{-4}$ |
| Trichloroethylene | $1.0 \times 10^{-2}$ |
| Trifluralin | $2.6 \times 10^{-5}$ |
| 1,2,4-Trimethylbenzene | $5.6 \times 10^{-3}$ |
| Vinyl chloride | $2.7 \times 10^{-2}$ |
| Xylene (mixed o-, m-, and p-) | $7.0 \times 10^{-3}$ |

TABLE 2

MODERATE HENRY'S CONSTANTS BUT BREAKDOWN PRODUCTS

| With High Henry's Constants | Henry's Constant |
|---|---|
| Dibutyl phthalate | $1.8 \times 10^{-6}$ |
| 2,4-Dichlorophenoxyacetic acid | $1.0 \times 10^{-8}$ |
| Di(2-ethylhexyl) phthalate | $3.6 \times 10^{-7}$ |
| 2,4-Dinitrotoluene | $1.3 \times 10^{-7}$ |
| 2,6-Dinitrotoluene | $7.5 \times 10^{-7}$ |
| Dinoseb | $4.6 \times 10^{-7}$ |
| Endrin | $7.5 \times 10^{-6}$ |
| Fluoranthrene | $6.5 \times 10^{-6}$ |
| Pentachlorophenol | $2.4 \times 10^{-6}$ |
| Phenol | $3.3 \times 10$–7 |
| Pyridine | $8.9 \times 10^{-6}$ |
| Toxaphene | $6.6 \times 10^{-6}$ |

The rate of biodegradation in natural formations is very slow compared to above-ground. Further, the ability to mix gases, electron donors, or nutrients with organic contaminates is limited by the porosity and hydraulic conductivity of saturated soils. Porous soils tend to encourage movement of liquids as slugs, not easily mixing with existing groundwater. The rate of natural movement is slow and determined by existing groundwater gradients. Velocities of natural flows commonly run 0.1 to 2 ft/day. The natural flow across a 100 ft wide contaminant zone may take 50 to 1000 days. The capability to remove product waste products is similarly hindered.

To address these issues, an efficient technique to provide reaction promoters and simultaneously to remove unnecessary products is desirable. "Food," for the bacteria, in the form of carbon sources which provide energy, (electron donors) is available in liquid form. Nutrients also can be mixed with "food" forms to assure ready availability of all required components for remediation conditions and organism growth enhancing environments. The presence of both as a coating to oxygen-enriched air provides bacteria with a very mobile nutrient system. In addition, gaseous products such as $CO_2$ can be transported away (i.e., displaced from the remediation area) as the gas rises. Microbubble (or similarly, nanobubble) technology thus provides an alternate technique for oxidant delivery having attributes to meet these needs.

A microbubble can be "coated" by forcing microbubbles from less than about 200 microns, e.g., 0.5 to 200 micron size through a porous liquid stream in a diffuser, (e.g., a "laminated" Microporous Spargepoint® diffuser (Model Nos. SPT2000 and SPT2010), available from Kerfoot Technologies, Inc., Mashpee, Mass.) or by introducing aerosolized liquid particles into the gas stream supplying a diffuser.

While not being bound by theory, generally, coatings made by forcing the microbubble through the liquid stream result in relatively thicker coatings caused, in part, by the thicker reaction points of the liquid forced through the gaseous phase in the diffuser. Conversely, those generated by the aerosol method result in microbubbles with relatively thinner coatings caused, in part, by the finer porous points of the liquid when introduced as an aerosol. Thicker coatings generally elevate the reactivity of the microbubble, particularly in oxidative reactivity. For example, thicker coatings of oxidative material is associated with increased Criegee oxidative capacity or oxidative potential (see, Dowideit and Sonntag, *Environ. Sci. Technol.* 1998, 32, 112-1119, incorporated by reference in its entirety), that is, the ability of the microbubble to break bonds of the chemical compound or contaminant subject to oxidative degradation. The thickness of a coating is ascertained by techniques such as microscopic capillary analysis of the microbubbles with dyes (e.g., India ink), back-lighting, or photoelectric cell detection methods.

The microbubbles can include a thin-layer coating having a material suitable for oxidative reactivity. So called, "high oxidative capacity" or "advanced oxidative" systems (e.g., using potassium or sodium permanganate, ozone in high concentrations, Fenton's reagent) are capable of particularly efficient chemical reactivity (e.g., bond breaking capacity, carbon-containing compound reactivity) useful in contaminant degradation processes. These reactions are characterized in that they have oxidation potentials in excess of 2.0 volts (based on electrochemical reactions at 25° C.).

Depending on the size and thickness of the microbubbles different reactivity profiles can be achieved. Additionally, the composition of the gas in the bubble, as well as the type of liquid coating selected is chosen to accomplish various oxidative or reductive degradation profiles, and catalysts (e.g., metals in microparticle form, acids) can be incorporated into the microbubble to increase reactivity and degradation efficiency of the microbubble. Moreover, the methods of generating microbubbles allow for control of the stoichiometry of the chemical components in the microbubble, again allowing for the ability to tailor the microbubble to a specific profile for a desired application or reactivity. By increasing the flow of liquid during the flow of gas, the thickness of the coating can be increased. The strength of oxidation capacity can be affected by increasing the concentration of hydrogen peroxide in the liquid phase as well as increasing the ozone content in the gas phase.

The size of the microbubble can be varied by controlling the pressure of the gas during generation of the microbubble and by choice of the diffuser pore size. For example, by generating smaller coated microbubbles, the surface to volume ratio increases, which improves reactivity of the microbubble. Additionally, in instances where a coating thickness is held constant, a smaller coated microbubble effectively has a "thicker" coating relative to a larger coated microbubble, thus resulting in a coated microbubble with a "thicker" coating and greater surface area (relative to volume), which both contribute to increased reactivity (e.g., in oxidative coating applications, higher oxidative potential). Normally, the range of fluid to gas varies from parity (1:1) to about 1:100. This corresponds to a coating thicken of 0.3 (30%) increase in radius down to 0.01 (1%). Table 3 illustrates the relationship between gas and liquid volumes and variance in the coating thickness.

exhausted. By providing a technique for ready mixing of the constituents and having the capacity to modify the electron accelerator and nutrient ratios, using metabolic products as a guide (e.g., monitoring by-products formation in real time by sampling via a monitoring well and analyzing the samples using, for example, gas chromatography or other suitable analytical technique), the rate of metabolism can be adjusted and maximized.

Microbubbles form a unique physical and chemical environment which can effectively treat waterborne or attached (adsorbed) volatile organic compounds (VOCs). Diffusers, or spargers, placed in groundwater or saturated soil provide extremely small "microbubbles" with a very high surface area to volume ratio. This high surface area to volume ratio maximizes the VOC transfer from the liquid phase to gas phase. If the air bubbles are filled with an oxidizing gas, like ozone, the VOCs react with the ozone and are destroyed while still in the water column. This "in-situ"-combined VOC recovery and destruction not only obviates the need for an additional process step but also enhances the physical and chemical kinetics of the process.

Catalysts are any material useful in catalyzing the desired chemical transformation or process to promote quicker or

TABLE 3

RELATIONSHIP OF MICROBUBBLE GAS VOLUME TO LIQUID VOLUME WITH CHANGE IN COATING THICKNESS MICROBUBBLE SIZE (MM)

| | Radius | | | |
|---|---|---|---|---|
| | 1.0 mm | .10 mm | .01 mm | .001 mm |
| | | | Diameter | |
| | (2000 micron) | (200 micron) | (20 micron) | (2 micron) |
| Gas Volume | 4.189 mm$^3$ (1 m$^3$/day) | .00419 mm$^3$ | .00000419 mm$^3$ | .00000000419 mm$^3$ |
| Liquid Volume (tenths of radius) | | | | |
| .05 | 660 mm$^3$ (.157 m$^3$/day) | 0.00066 mm$^3$ | 0.00000066 mm$^3$ | 0.0000000066 mm$^3$ |
| .10 | 1.387 mm$^3$ (.33 m$^3$/day) | .00138 mm$^3$ | .00000138 mm$^3$ | .00000000138 mm$^3$ |
| .20 | 3.049 mm$^3$ (.73 m$^3$/day) | .00305 mm$^3$ | .00000305 mm$^3$ | .00000000305 mm$^3$ |
| Surface Area | 12.57 mm$^2$ | .1257 mm$^2$ | .001257 mm$^2$ | .00001257 mm$^2$ |
| Surface-to-Volume Ratio | 3 | 30 | 300 | 3000 |

The diameter of the microbubbles is selected according to a controlled size using a layered fine bubble production chamber. The layered fine bubble production chamber is a chamber in which a liquid is placed under pressure and microbubbles are generated. That is, over a period of time, an environment is provided where the microbubbles segregate by size (e.g., larger microbubbles rise and smaller microbubbles remain) thus allowing a mixture predominated by a particular microbubble size (or size range) to be established prior to injection into the treatment area. This is suitable for use, for example, where smaller microbubbles may be desired (i.e., for their higher surface to volume ratio).

One example of such control relates to the "Law of the Minimum", which states that bacterial growth will stop when the nutrient that was present in the lowest concentration (relative to the requirement) is exhausted, which becomes a problem since the rest of the mixture is useless. If that substance is replenished, growth will stop when the next substance is more efficient reaction. The catalysts are presented as micron-sized particles to augment the interface region of the microbubble. For example, transition metals including palladium (Pd), manganese (Mn), and iron (Fe), in elemental or salt forms; sulfur compounds including sulfates and sulfides.

Additionally, the acidity of reaction processes can be adjusted to enhance reactivity, and therefore the remediation processes herein. For chemical reactions (i.e., remediation processes) that are more effective under lower pH conditions (i.e., acidic, pH less than 7) the microbubbles can be coated with an acidic coating, thus lowering the pH of the interface and increasing the reaction rate and efficiency of the remediation process. The acid can also be incorporated in a coating having other liquids in it where beneficial (e.g., increased reactivity, efficiency) chemical effects can be realized, for example, acid and iron (II or III) salts (e.g., Fenton's reagent), which in combination can catalyze the oxidative reactivity of the coated microbubble. This is advantageous in soil aquifers, where it is impractical to acidify the entire aquifer, and is also useful in reactions and remediation processes involving halocarbon contaminants.

Nutrient coatings on the microbubbles are any suitable nutrient for bacterial (aerobic or anaerobic) growth. Such nutrients include, for example, carbon sources (e.g., carbohydrates, sugars, beer, milk products, methanogens, organic acids such as acetic and lactic acids, organic esters such as acetates, proprionates, organic ketones such as acetone), nitrogen sources (e.g., ammonia, nitrates, ammonium nitrate), phosphorous sources (e.g., soluble phosphates, etc), and potassium sources (e.g., 10,000 ppm of lactate; 680 ppm $NH_4NO_3$; 200 ppm $KH_2PO_4$ to provide sources of carbon and nitrogen, and phosphorus and potassium). Generally, environments suitable for bacterial support and growth are made up of the nutrients in the following relative ratios: carbon (ca. 1000 parts), nitrogen (ca. 150 parts), phosphorous (ca. 30 parts), sulfur, potassium, and sodium (ca. 10 parts each), calcium, magnesium, and chloride (ca. 5 parts each), iron (ca. 2 parts), and any remainder elements in trace amounts, with the ratios based on molar equivalents, which may be in the form of either elemental or ionic (i.e., salt) forms, or a combination thereof.

In-situ stimulation of bacteria will not only cause increased contaminant biodegradation, but will also cause permeability decreases in porous media (Kalish et al. "The Effect of Bacteria on Sandstone Permeability", *J. of Pet. Technol.*, 16:805 (1964); Shaw et al. "Bacterial Fouling in a Model Core System", *Appl. Environ, Microbil.*, 49(3): 693-701 (1965)). Particularly around injection well screens, biofilm clogging presents a persistent headache to operators. The injection of oxygen, glucose, carbon sources and nutrients (e.g., $KH_2PO_4$, $NO_3$, etc.) promote bacterial growth. When colony-forming bacterial units per gram of soil (cfu/gm) exceed 100,000 units, permeability ($K_1/K_{base}$) can be reduced by half. Brough et al. ("Active Biofilm Barriers for Waste Containment and Bioremediation: Laboratory Assessment", in Vol. 4, *In-situ and On Site Remediation,* Battelle Press, Columbus, Ohio (1997)) has demonstrated that sodium hypochlorite (a common bactericide) can restore permeability by reducing cfu/gm levels. The biocide would have to be fed periodically or adjusted to limit cell growth to that where flow was maintained.

To address this situation, injection strategies can be used to modulate growth in a manner that does not adversely impact permeability. These strategies aid in avoiding plugging of the diffusers (e.g., Spargepoint®) because the ozone levels within close proximity of the diffuser are of a bactericidal concentration (thus killing bacteria and avoiding bacterial build-up near the diffuser) while at a further proximity, the ozone levels are conducive to proliferation of ozonophilc bacteria. Such strategies include, for example:

1. Intermittent Pulsing—periodic pulsing (e.g., 15 min.; 30 min; 1 hour intervals) with concentrations of oxidant adjusted to maintain a bactericidal zone within about 3 feet (ca. 1 meter) of the (e.g., Spargepoint® location) yet also maintain a 1 to 200 ppmv range across the 20-30 foot (ca. 10 meter) radius of influence (ROI) of the ozone to assist ozonophilic species;
2. Inject with Periodic High Dosages of Ozone—injection of high dosages of ozone (e.g., 300 to 1000 ppmv), but injected in intervals such that in between each injection a period of time is introduced such that enough time is allowed (e.g., 2-3 days) for recovery of the bacteria population (i.e., growth, proliferation) between "slugs" of oxidant introduction to allow "rebound" or reestablishment of ozonophilic bacterial populations.

Bacterial populations at the site are identified and the remediation technique is tailored to optimize the levels of the bacterial populations at the site to effect remediation of toxic organic compounds. Tailoring of the remediation can be used to optimize digestion rates of the bacterial populations at the site. The introduction of oxidant (e.g., ozone, ozone/$H_2O_2$) can optimize bacterial proliferation and/or bacterial activity at the site, while causing gas/liquid thin-layer microbubble oxidation to predigest and sterilize areas around injection locations. Nutrients and food source can be simultaneously injected with gas in proportion to an optimal ratio for assimilation. The nutrients can be injected to provide a coating (thin layer) over the gas (oxygen-enriched air) injected into porous soil capillaries.

Advantages of the techniques include: 1) modulation of the treatment site (e.g., local surroundings, clean-up site, contaminated site) to an environment where ozonophilic bacteria are more amenable to thrive (e.g., proliferate, metabolize toxic organic compounds (e.g., those delineated herein); 2) oxidation of carbon compounds (e.g., aliphatics, aromatics, toxic organic compounds, etc.) thereby creating substrates (e.g., oxygenated forms of carbon compounds, alcohols, ethers, aldehydes, ketones, esters, carboxylic acids, etc.) that are more easily processed (e.g., metabolized, digested, fragmented) by the bacteria, which can result in increases in the toxic compound/contaminant degradation rate, as well as increased proliferation of particular bacterial populations; 3) supplementing and/or enhancing the bacterial population (including any bacteria of the specific genera delineated herein) at the treatment site; 4) creation of an environment at the treatment site, which encourages bacteria capable of degrading (e.g., metabolizing, fragmenting, removing, remediating) carbon compounds to flourish.

In order that the techniques may be more readily understood, the following examples are set forth. It should be understood that these examples are for illustrative purposes only and are not to be construed as limiting in any manner. All references cited herein are expressly incorporated by reference in their entirety.

EXAMPLES

Screening Protocols

Example 1

Identification of Ozonophilic (Ozone-Loving) Hexadecane Degrading Bacteria

Bench scale tests were conducted on groundwater collected from a monitoring well. The groundwater was suspected to contain dissolved petroleum components from a former fuel oil release at the property. Samples were obtained from the site and tested within 6 hours of collection. The tests included treating five (5) groundwater samples with a combination of micro-sparged gases and hydrogen peroxide. A batch of five (5) tests were run on the samples and included the following parameters:

TABLE 4

BATCH TEST PARAMETERS TABLE

| Sample Name | Gas Flow Rate (1 pm) | Ozone Conc. (ppmV) (2) | Peroxide Flow Rate (mL/min) (3) | End of Test Groundwater Sample Name |
|---|---|---|---|---|
| Background (1) | NA | NA | NA | B1 |
| Test 1 | 0.8 | NA | NA | A |
| Test 2 | 0.8 | 100 | NA | AO100 |
| Test 3 | 0.8 | 300 | NA | AO300 |
| Test 4 | 0.8 | 300 | | AOP300 |
| Test 5 | 0.8 | 10 | NA | AO10 |

NOTES:
(1) = Subsample of collected groundwater from well MW-7
(2) = Measured using "Kitagawa" Type SB ozone detector tubes
(3) = 9% solution of hydrogen peroxide
All tests contents were stirred using a Teflon ®-coated stirbar Each test was conducted in a 1.5 liter glass reaction cell. Approximately 1300 mL of contaminated groundwater was poured into the reaction cell and subject to 30 minutes of treatment, including the treatment parameters as delineated in the table above. Following the conclusion of each test, groundwater samples were collected from the test cell and refrigerated. Subsamples can be analyzed for volatile fatty acids (VFA) and petroleum fractions.

Example 2

Ratio of Total Hexadecane Degraders to Total Heterotrophs

Bacteria in groundwater were enumerated by the plate count method essentially according to Standard Methods (18th Ed.) 9215 C, using one-third concentration of Nutrient Agar. Hexadecane degraders were plated on Noble Agar and grown in an atmosphere of hexadecane as the sole carbon source. Both total and specific degraders (e.g., bacteria) were incubated under aerobic conditions.

Incubation on the nutrient agar in hexadecane was inspected daily. As it is known that bacteria near an ozone injection source are reduced in number, observation of bacteria indicate that those bacteria must have the capacity for rapid regrowth. Inspection showed that four different colonies of bacteria emerged with very rapid regrowth. These colonies were then inspected under microscopic examination to identify the bacterial types present. A subsample can then be taken for genetic probe analysis and bacterial genotyping.

Based on these results, certain characteristics can be identified regarding the ozonophilic bacteria, including:

(1) isolation from petroleum-contaminated groundwater and soil subjected long-term to ozone pulsing;
(2) capacity for rapid growth (e.g., greater than 100,000 cfu per hour) when exposed to 10 to 100 ppmv ozone and plated on Noble agar and grown in an atmosphere of hexadecane and incubated under aerobic conditions;
(3) maintaining a high ratio (e.g., 1.0 to 1.3) of total hexadecane degraders to total heterotrophic bacteria (the nearly 1:1 ratio of heterotrophic to hexadecane degrading bacteria being an indication that the bacteria are acclimated to fuel containing alkanes such as hexadecane);
(4) capacity to quickly degrade volatile fatty acids (VFAs) (the low level (<0.1 mg/L) of VFAs from samples of rapidly growing hexadecane degraders (10-100 ppmv ozone) being an indication that the high number of aerobic bacteria are rapidly consuming VFA products of petroleum degradation)

One of the fast growing bacteria found was a *pseudomonas* sp. The genus *pseudomonas* has been found previously after oxidation of PAHs (Richard Brown et al., "Combining Oxidation and Bioremediation for the Treatment of Recalcitrant Organics", *Fourth International In situ and On-site Bioremediation Symposium: Volume 4 Chemical and Physical Processes in Support of Bioremediation,* Battelle Press, Columbus, Ohio, pp. 457-462, 1997) and following ozone treatment of diesel fuel (Jung et al., "Treatment of PAH Contaminated Soil by Ozonation, Soil Washing and Biological Treatment", Abstracts, *The Second International Conference on Oxidation and Reduction Technologies for In-Situ Treatment of Soil and Groundwater,* Nov. 17-21, 2002, Toronto, Canada.). Generally, it has been assumed that they occur due to highly oxygenated (e.g., aerobic) conditions and developed fragmented alkane or phenolic by-products. Jung et al. dealt with high ozone concentrations which decreased bacterial concentrations. This differed from the instant application wherein rapid, repeatable growth is observed when lower concentrations of ozone (e.g., 1 to 300 ppmv) are used.

Example 3

Bacterial Analysis

One isolate bacterial colony (ID=10-3; also referred to as a "creamy" colony) was found to be highly motile with very small rods. The isolate colony tested oxidase positive and there was no evidence for anaerobic respiration with nitrate as terminal electron acceptor. The isolate colony appeared to have strictly molecular-oxygen dependent growth and was identified as being a member of the genus *Pseudomonas* or a new realignment made in this genus.

The agar medium with this creamy colony type also exhibited a very "thin," nearly transparent colony thereon. This also turns out to be high motile, oxidase positive, colony capable of anaerobic growth with nitrate as electron acceptor (thus, able to carry out denitrification or nitrate respiration). Several members of *Pseudomonas* (or other related genera) are characterized by this trait.

Thus, analysis of the bacterial population of the samples described above indicate the presence of several genera and species; including a *pseudomonas* sp. 1 (small rods, oxidase positive, nonanaerobic) and a *pseudomonas* sp. 2 (motile, oxidase positive, anaerobic).

Example 4

Pre-Treatment Evaluation

Site investigation, in part to define the extent of spill both vertically and horizontally, was conducted as follows. A total of ten boreholes were manually advanced through the unsaturated zone to slightly below the saturated groundwater interface using a hollow probe and slotted intake. Soil gas samples were collected and processes through a photoionization detector (PID) system (HNu Model GP101). Groundwater interface samples were collected from each borehole location. The groundwater samples were screened from each monitoring well and at each borehole for ionizable, dissolved petroleum compounds using a portable gas chromatograph (HNu Model 301 GC). Three of the groundwater samples were submitted for laboratory analysis as the "worst-case"/largest peak area samples identified from the field GC screening efforts.

A groundwater elevational survey was performed using six (6) monitoring wells. Inspection of the wells showed no sheen or separate phase product present on the water table. Laboratory results indicated exceedance of groundwater clean-up standards (2,200 μg/L and 4,400 μg/L of n-C9 and n-C18 aliphatic hydrocarbons, respectively. There was no indication that the area of contamination migrated offsite. Roughly, an elliptical area 60 feet long and 30 feet wide bounded the regions of hydrocarbon contamination.

Example 5

Installation of Treatment System/Operation

Installation of a system for perfusing air and ozone below the groundwater for remediative treatment of soil and groundwater included insertion of Spargepoint® diffusers. During operations, negative pressure was applied to the cellar to prevent fugitive vapors from invading the property buildings. During a five-week period, air/ozone gas and liquid hydrogen peroxide were added in areas of highest soil and groundwater contamination. Approximately 60 gallons of 5% solution of hydrogen peroxide was injected as a catalyst to enhance chemical oxidation of the petroleum-impacted soil and groundwater. Sampling for soil and groundwater extractable petroleum hydrocarbons, groundwater dissolved oxygen (DO), oxidation-reduction potential (ORP) and temperature elevations were performed periodically to assess system performance.

The gas/liquid introduction used a flow of 4 cfm, consuming about 5 gallons/day of hydrogen peroxide in a 5-8% solution. The total amount of oxygen delivered per day could be broken down as follows:

System Delivered:
  Oxygen in air: 50 kg/day
  Oxygen in ozone: 0.3 kg/day
  Oxygen in peroxide: 1.2 kg/day (5 gal/day, 5-8% solution)
  Intermittent dosing (1 week per month)

Ozone depleted rapidly from the point of injection. A series of miniature points were placed at 10-foot intervals from injection and the ozone gas concentration was measured from the headspace of bubbles in solution. The injected concentration of 250 ppmv ozone decreased to 6 ppmv within 20 feet of injection. By comparing the groundwater DO and ORP results, the effective radius of influence was found to be about 30 feet to maintain a mean concentration of DO above 1.0 mg/L.

In the center of the plume (e.g., MW-3), the concentration of dissolved oxygen rose from about 1.4 to about 6.4 mg/L during treatment. Redox potential rose from about 45 to about 200 mv. The treated soil rose in temperature from 9° C. (48.2° F.) to 13 to 19.5° C. across site, about a 5-6° C. (9-11° F.) rise.

After approximately 10 weeks of treatment, the Extractable Peteroleum Hydrocarbon Method ("EPH"; Massachusetts Department of Environmental Protection) components had consistently declined to levels below applicable maximum allowable contaminant level ("MCL") according to the Massachusetts Contingency Plan ("MCP"). Method GW-1 and GW-1/s-1 groundwater and soil cleanup standards. Further system monitoring parameters indicated dissolved oxygen levels and redox potential commensurate in change with effective treatment conditions. The remediation was operated over a period of five months (equivalent to four months continual operation due to suspension of operation during night time).

Example 6

Site Treatment Protocol

The correct volume and mass of ozone can be delivered to a sample or site by a single microporous Spargepoint® (HYDE, Kynar, stainless steel), manifolded to run multiple Spargepoint® diffusers simultaneously with single or double feed lines, which can be installed in a stacked vertical array (clustered) or fed by a special multi-channel tubing with wrap-around crimped microporous stainless steel or microporous cylinders with swage-like locks and penetrating tube which can be slid into place before installation with a hollow stem auger or equivalent insertion device.

Tests were conducted on groundwater samples near the source of the fuel spill under remediation about 48 hours after completion of treatment. Background samples of petroleum-enriched groundwater (i.e., before ozone injection) contained low levels of total hexadecane degraders (<500 cfu). Upon microsparging for about 30 minutes with ozone (10-100 ppmv), the bacterial population increased to about 500,000 to 1,000,000 cfu. Concentrations at 300 ppmv appeared lethal to the bacteria, but 10 ppmv was found to be exceptionally stimulating to the bacteria. Considering normal attenuation with distance from injection, pulsing with up to 300 ppmv would create a radius from about 5 feet to about 30 feet of ozone within the 0.5 to 100 ppmv range—ideal for encouraging bacterial breakdown while providing levels of ozone capable of fragmenting the aliphatic chains of the fuel oil components.

Simultaneous analysis of aliphatic C9-C36 hydrocarbons showed an increase in small carbon chains (e.g., C9-C16) while substantial reduction of longer chain aliphatics (e.g., C18-C36) occurs with ozone and ozone/peroxide addition. The bacterial populations utilize the fragments as carbon sources during their spectacular growth (i.e., proliferation) under the 10 and 100 ppmv ozone concentration treatment conditions. Reduction of methyl naphthalene, acenaphthalene, benzo(a)anthene, dibenzo(a,h)anthracene, and benzo(k)fluoranthene was also occurring in the aromatic fractions.

Ozone concentrations thus can vary depending on the amount of depletion of bacteria that is tolerable in regions proximate to the point of entry of the ozone, the type of bacteria, and the method and frequency of application. Continuous treatment refers to a steady, or essentially uninterrupted flow, while pulsed applications refer to non-steady or small interruptions (e.g., regular, interval, rhythmic) in the flow. For instance, in a continuous treatment ozone can be introduced in a range of about 0.5 to about 100 ppmv, preferable in a range of about 5 to about 80 ppmv; whereas, if introduced in a pulsed manner the ozone can be introduced in higher ranges, especially if longer intervals are provided between pulses of the ozone (e.g., introduction from 10 to 500 ppmv, if there is one hour between pulses). Concentration can also be determined based on the corresponding dissolved ozone concentration, for example, ozone is utilized to provide a dissolved ozone concentration in a range between about 0.5 and about 10 mmol/liter.

Example 7

Analysis of Treated Site After Treatment Cessation

Groundwater wells at the treatment site were reexamined for total heterotrophic bacteria and total hexadecane degraders (cfu/mL) approximately nine months after cessation of ozone sparing of the treatment site. The table below summarizes the results as well as bench-scale tests results of ozone additions to well samples.

In the table, the following samples from monitoring wells with the designations (monitoring wells not shown) are: MW-7A (air addition), MW 7-3 (3 ppmv ozone addition), MW 7-10 (10 ppmv ozone addition), MW 7-100 (100 ppmv ozone addition), MW 7-300 (300 ppmv ozone addition), MW 7-300P (300 ppmv ozone+hydrogen peroxide addition).

The total hexadecane degraders upon exposure to 10 ppmv ozone dropped in number (i.e., 20,000 to 15,000) compared to previously where the hexadecane degraders increased ca. 10-fold (i.e., 100,000 to 1,000,000), indicating that the bacterial population at the site after cessation of treatment no longer is ozonophilic, or has reverted back to a "reducing condition" (e.g., wherein the relative population of ozonophilic bacteria is smaller, and ozone administration results in reduction (e.g., killing) of bacteria, particularly those genera and species that are not ozonophilic. Instead of growing when exposed to ozone, a decrease in the population is observed. This indicates a difference in bacterial population as compared to that where ozone treatment was applied, particularly after a period of acclimation, that is a period (e.g., few days, 2-3 weeks) where ozone treatment was applied and resulted in an environment such that the ozonophilic populations would proliferate.

TABLE 5

BACTERIAL ENUMERATION IN WELL SAMPLES
colony forming units (cfu)/mL

| Sample | Total Heterotrophs cfu/mL | Total Hexadecane Degraders cfu/mL |
|---|---|---|
| MW 7 | 35,000 | 20,000 |
| MW 2 | 11,000 | 3,000 |
| MW 3 | 80,000 | 48,000 |
| MW 4 | 50,000 | 20,000 |
| MW 7A | 45,000 | 12,000* |
| MW 7-300 | <400 | <400 |
| MW 7-100 | 50,000 | 12,000 |
| MW 7-10 | 70,000 | 15,000* |
| MW 70-300P | <400 | <400 |
| MW 7-3 | 20,000 | 20,000* |
| Detection limit | <400 | <400 |

*The hexadecane degraders grew as very small colonies, as if stressed.

A number of embodiments of the invention have been described. Nevertheless, it will be understood that various modifications may be made without departing from the spirit and scope of the invention. Accordingly, other embodiments are within the scope of the following claims.

What is claimed:

1. A method of treating a site that is contaminated with toxic organic compounds, comprising:
introducing ozonophilic bacteria within a liquid coating of bubbles to the site.

2. The method of claim 1 wherein the ozonophilic bacteria are introduced through a microporous diffuser.

3. The method of claim 1 wherein the liquid coating of bubbles includes at least one of hydrogen peroxide and water.

4. The method of claim 1 wherein the bubbles include a gas used to make the bubbles.

5. The method of claim 4 wherein the gas is not ozone.

6. The method of claim 4 wherein the gas is one of ozone and oxygen.

7. The method of claim 1 wherein the ozonophilic bacteria include at least one type of bacteria from the genera *Microbacterium, Gordonia* (2), *Hydrogenophaga, Nocardia, Rodococcus, Sphingomonas, Xanthobacteria, Algallgenes* (2), *Mycobacteria, Rubrivivax, Arthrobacter, Acidovorax, Burkholderia, Variovsarax,* and *Pseudomonas.*

8. The method of claim 1 wherein introducing ozonophilic bacteria occurs if the existing levels of ozonophilic bacteria are less than about 10,000 cfu/mL in a groundwater sample or less than about 25,000 cfu/gm in a soil sample.

9. The method of claim 1 wherein the step of introducing ozonophilic bacteria occurs if the type of bacteria is not from at least one of the genera of the *Microbacterium,* the *Burkholderia,* the *Pseudomonas* and the *Xanthobacteria* genus.

10. The method of claim 1 wherein ozone is introduced to the site after introducing the ozonophilic bacteria at an ozone concentration sufficient to stimulate growth of the ozonophilic bacteria.

11. The method of claim 10 wherein the ozone is introduced to the site at an ozone concentration sufficient to stimulate the growth of the ozonophilic bacteria without killing the ozonophilic bacteria outside a distance of about one meter from the location of ozone introduction to the site.

12. The method of claim 10 wherein the ozone is introduced in a range of 1 to 300 ppmv to stimulate growth of the ozonophilic bacteria in a distal region from the location of ozone introduction to the site.

13. The method of claim 1 wherein the step of introducing ozone comprises introducing the ozone as microbubbles.

14. The method of claim 13 wherein the microbubbles are introduced using a microporous diffuser.

15. The method of claim 10 wherein the step of introducing ozone occurs after dispersion of the ozonophilic bacteria.

16. The method of claim 13 wherein the microbubble size is between 0.3 microns and 200 microns.

17. The method of claim 2 wherein the microporous diffuser is treated with a cleaning agent after the ozonophilic bacteria are introduced.

18. The method of claim 17 wherein the cleaning agent is a biocide.

19. The method of claim 18 wherein the biocide is sodium hypochlorite.

20. The method of claim 17 wherein the cleaning agent is introduced when the colony-forming bacterial units per gram of soil (cfu/gm) exceed 100,000 units.

* * * * *

UNITED STATES PATENT AND TRADEMARK OFFICE
CERTIFICATE OF CORRECTION

PATENT NO. : 7,645,384 B2 Page 1 of 1
APPLICATION NO. : 12/254359
DATED : January 12, 2010
INVENTOR(S) : William B. Kerfoot It is certified that error appears in the above-identified patent and that said Letters Patent is hereby corrected as shown below:

Column 3, Line 13, "includes" should read --include--; Line 43, "typically" should read --typical--;
Column 4, Line 6, "on-site in" should read --on-site--;
Column 6, Line 23, "can e" should read --can be--;
Column 16, Line 58 "processes" should read --processed--.

Signed and Sealed this

Sixteenth Day of March, 2010

David J. Kappos
*Director of the United States Patent and Trademark Office*